(12) United States Patent
Mack et al.

(10) Patent No.: US 9,182,015 B2
(45) Date of Patent: Nov. 10, 2015

(54) TENSIONING DEVICE FOR A TRACTION MECHANISM DRIVE OF AN INTERNAL COMBUSTION ENGINE

(75) Inventors: Stefan Mack, Erlangen (DE); Andrea Reichert, Emskirchen (DE); Christian Hauck, Altdorf (DE); Bernd Hartmann, Weisendorf (DE); Hans Bauer, Wilhermsdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 334 days.

(21) Appl. No.: 13/878,310

(22) PCT Filed: Sep. 30, 2011

(86) PCT No.: PCT/EP2011/067064
§ 371 (c)(1),
(2), (4) Date: Apr. 8, 2013

(87) PCT Pub. No.: WO2012/049030
PCT Pub. Date: Apr. 19, 2012

(65) Prior Publication Data
US 2013/0203535 A1 Aug. 8, 2013

(30) Foreign Application Priority Data
Oct. 13, 2010 (DE) .......................... 10 2010 048 206

(51) Int. Cl.
*F16H 7/12* (2006.01)
*F16H 7/08* (2006.01)

(52) U.S. Cl.
CPC .............. *F16H 7/129* (2013.01); *F16H 7/1281* (2013.01); *F16H 2007/0806* (2013.01); *F16H 2007/0874* (2013.01)

(58) Field of Classification Search
CPC ............ F16H 2007/081; F16H 7/1281; F16H 7/1218; F16H 2007/0806; F16H 2007/0893
USPC .......................................... 474/133, 134, 135
See application file for complete search history.

(56) References Cited

U.S. PATENT DOCUMENTS

| 976,115 A | * | 11/1910 | Bard .............................. 474/134 |
| 1,557,486 A | * | 10/1925 | Valentine ....................... 474/135 |
| 3,473,399 A | * | 10/1969 | Buchwald ........................ 474/87 |

(Continued)

FOREIGN PATENT DOCUMENTS

| CN | 2481907 Y | 3/2002 |
| CN | 101072961 A | 11/2007 |

(Continued)

*Primary Examiner* — Henry Liu
(74) *Attorney, Agent, or Firm* — Volpe and Koenig, P.C.

(57) ABSTRACT

A tensioning device (11) for a traction mechanism drive (1) which is arranged on an internal combustion engine and includes a drive wheel (3) arranged on a drive shaft (30) of an engine (4), one or more additional driving wheels (5, 6), and a continuously revolving traction element (2), which wraps around the drive wheel and additional driving wheels. The tensioning device has two tensioning arms (13, 14) having tensioning wheels (9, 10) mounted thereon, which apply a tensioning force to the traction element in front of and behind the drive wheel in the direction of revolution, and is provided with a spring (16) generating the tensioning force, and a tensioner housing (12), which movably mounts at least one of the tensioning arms to which the force of the spring means is applied. The tensioner housing is mounted on the engine pivotably about the axis (29) of the drive shaft.

8 Claims, 3 Drawing Sheets

(56) References Cited

U.S. PATENT DOCUMENTS

| | | | |
|---|---|---|---|
| 3,888,217 A * | 6/1975 | Hisserich | 123/90.31 |
| 4,351,636 A * | 9/1982 | Hager | 474/135 |
| 4,758,208 A * | 7/1988 | Bartos et al. | 474/135 |
| 4,826,471 A * | 5/1989 | Ushio | 474/135 |
| 5,045,029 A * | 9/1991 | Dec et al. | 474/112 |
| 5,045,031 A * | 9/1991 | Thomey | 474/138 |
| 5,083,983 A * | 1/1992 | Hirai et al. | 474/135 |
| 5,377,796 A * | 1/1995 | Friedmann et al. | 192/3.29 |
| 6,648,783 B1 * | 11/2003 | Bogner | 474/134 |
| 6,830,524 B2 * | 12/2004 | Tamai | 474/134 |
| 6,857,979 B2 * | 2/2005 | Macnaughton et al. | 474/135 |
| 7,468,013 B2 * | 12/2008 | Di Giacomo et al. | 474/134 |
| 7,494,434 B2 * | 2/2009 | Mc Vicar et al. | 474/109 |
| 7,678,001 B2 | 3/2010 | Seeber | |
| 7,682,272 B2 * | 3/2010 | Park | 474/137 |
| 7,824,286 B2 * | 11/2010 | Schmid et al. | 474/138 |
| 7,892,125 B2 * | 2/2011 | Nelson et al. | 474/134 |
| 8,002,657 B2 * | 8/2011 | Antchak et al. | 474/133 |
| 8,602,930 B2 * | 12/2013 | Deneszczuk et al. | 474/135 |
| 8,821,328 B2 * | 9/2014 | Jud et al. | 474/134 |
| 8,968,128 B2 * | 3/2015 | Wolf et al. | 474/135 |
| 2002/0039944 A1 * | 4/2002 | Ali et al. | 474/135 |
| 2002/0086751 A1 * | 7/2002 | Bogner et al. | 474/134 |
| 2006/0100051 A1 * | 5/2006 | Di Giacomo et al. | 474/170 |
| 2006/0217222 A1 * | 9/2006 | Lolli et al. | 474/134 |
| 2007/0037648 A1 * | 2/2007 | Di Giacomo et al. | 474/134 |
| 2008/0220919 A1 * | 9/2008 | Antchak et al. | 474/135 |
| 2009/0215564 A1 * | 8/2009 | Pflug et al. | 474/135 |
| 2009/0275432 A1 * | 11/2009 | Dell | 474/135 |
| 2009/0298631 A1 * | 12/2009 | Jud et al. | 474/237 |
| 2010/0022340 A1 * | 1/2010 | Schmidl et al. | 474/135 |
| 2010/0331127 A1 * | 12/2010 | Dec et al. | 474/135 |
| 2011/0070985 A1 * | 3/2011 | Deneszczuk et al. | 474/135 |
| 2011/0070986 A1 * | 3/2011 | Maguire et al. | 474/135 |
| 2012/0004059 A1 * | 1/2012 | Ma et al. | 474/135 |
| 2013/0040770 A1 * | 2/2013 | Wolf et al. | 474/134 |
| 2013/0079185 A1 * | 3/2013 | Schauerte et al. | 474/135 |
| 2013/0095967 A1 * | 4/2013 | Wolf et al. | 474/135 |
| 2013/0203535 A1 * | 8/2013 | Mack et al. | 474/134 |

FOREIGN PATENT DOCUMENTS

| | | |
|---|---|---|
| DE | 19926615 | 12/2000 |
| DE | 10044645 | 3/2002 |
| DE | 102006019877 | 10/2007 |
| DE | 102008025552 | 12/2009 |
| EP | 1600228 | 11/2005 |
| JP | 1122794 A | 1/1999 |
| WO | 2005064202 A1 | 7/2005 |

* cited by examiner

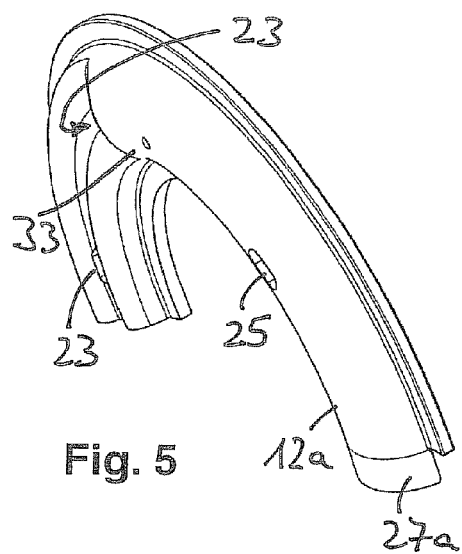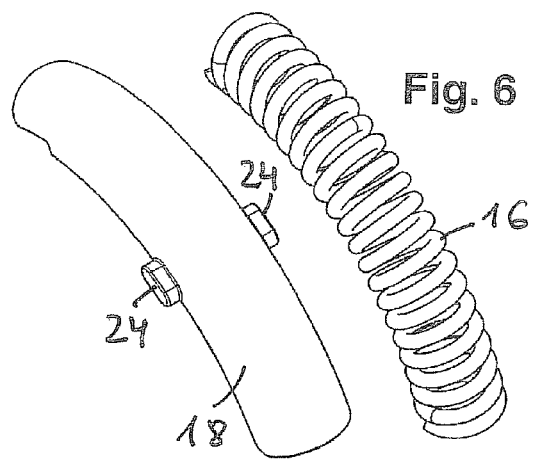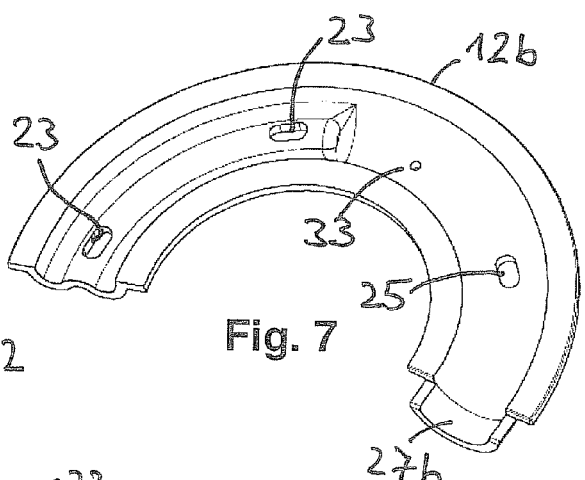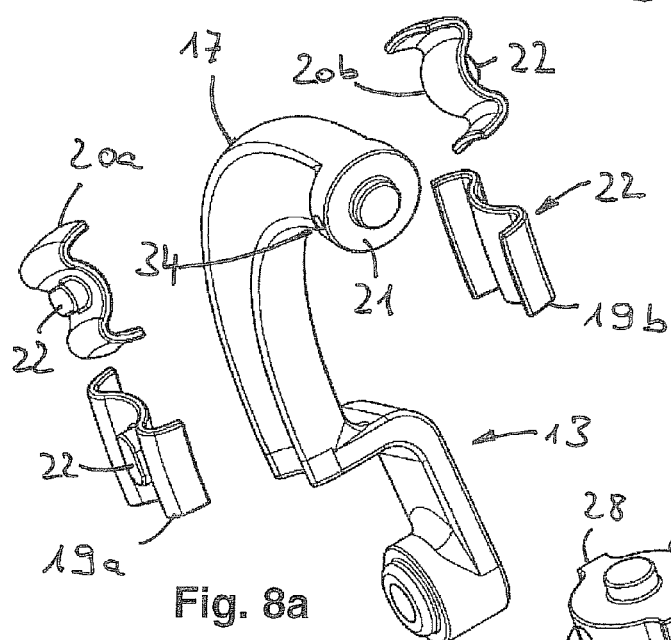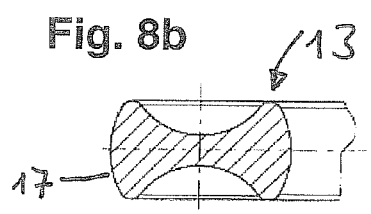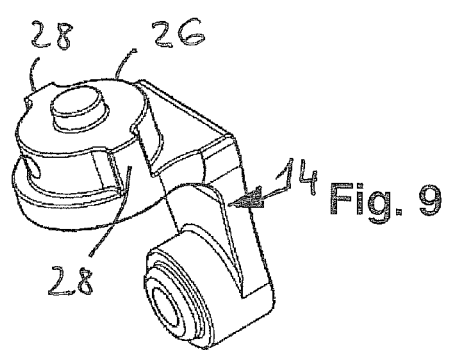

TENSIONING DEVICE FOR A TRACTION MECHANISM DRIVE OF AN INTERNAL COMBUSTION ENGINE

BACKGROUND

The invention relates to a tensioning device for a traction mechanism drive which is disposed on an internal combustion engine and has a drive wheel arranged on a drive shaft of a machine, one or more additional driving wheels and a continuously revolving traction means which wraps around the drive wheel and the additional driving wheels. The tensioning device comprises two tensioning arms, having tensioning wheels which are mounted thereon and apply tensioning force to the traction means in front of and behind the drive wheel in the direction of revolution, and has a spring means, which generates the tensioning force, and a tensioner housing, which movably supports at least one of the tensioning arms subjected to the force of the spring means.

Particularly in traction mechanism drives having driving wheels which alternately take up and deliver torque, and having a corresponding alternation of tight strand and slack strand, the tensioning of the slack strand calls for a tensioning device having two tensioning wheels which pretension the traction means in front of and behind the drive wheel of the alternately driving and driven drive shaft. The drive shaft is constituted typically and not necessarily by the shaft of the machine configured as a starter generator, which machine delivers torque for the starting of the internal combustion engine and takes up torque for the generation of current.

While the traction mechanism drives can basically be constituted by belt, chain or link conveyor drives, tensioning devices of the type stated in the introduction are typically known as belt tensioners in an ancillary unit belt drive in a variety of designs. In DE 199 26 615 A1, DE 10 2008 025 552 A1 and DE 10 2006 019 877 A1, for instance, are proposed tensioning devices which respectively have a tensioner housing, which is fastened to the starter generator, and two tensioning arms, which are mounted movably therein and the tensioning rollers of which are forced closer together by an intermediate spring means in order to tension the belt.

SUMMARY

Starting from the above, the object of the present invention is to improve the design of a tensioning device of the type noted in the introduction, particularly with regard to low complexity.

The solution thereto is provided in a mounting of the tensioner housing, which mounting is pivotable about the axis of the drive shaft, being provided on the machine. In other words, the tensioner housing, which is itself rotatably mounted, partakes in the tensioning motion, and the fastening of the tensioning device to the machine, and there to the starter generator or a separate unit carrier, which fastening is necessary in the cited prior art, can be dispensed with for the benefit of reduced component complexity. Moreover, the fitting of the tensioning device into the traction mechanism drive can be considerably simplified by virtue of the fact that the tensioning device and the drive wheel are connected and are screwed as one on the drive shaft.

In a preferred embodiment of the invention, the tensioner housing shall be mounted on the drive shaft or the drive wheel by means of a roller bearing. The friction of the roller bearing, which is considerably less than that of a slide bearing, not only ensures a durable and low-friction mounting of the tensioning device on the rotating drive shaft or rotating drive wheel, but is also accompanied by a correspondingly low damping of the tensioning device during the oscillating pivot motions of the tensioner housing. The inventive tensioning device is consequently not only suitable for the tensioning of traction mechanism drives with quasistatically alternating tight and slack strand, but can also serve for a dynamic decoupling of the generator from the rotational irregularities of the internal combustion engine. For, due to the dynamic oscillating motion of the tensioning device connected in a virtually undamped manner to the generator, a torque equilibrium in the tensioning device about the generator axis is obtained. The traction means vibrations which are generated by the rotational irregularities are thereby reduced.

In the case of the mounting on the drive wheel, it is particularly advantageous if the tensioning device forms with the drive wheel and the roller bearing, which latter is inserted in a circular-ring-shaped recess of the drive wheel radially between a bearing portion of the tensioner housing, said bearing portion running in the recess, and a hub of the drive wheel, a structural unit which can be fitted onto the drive shaft. As mentioned above, the advantages lie, on the one hand, in the very simplified fitting of the tensioning device and, on the other hand—due to the components placed such that they are radially nested one inside the other—in its, in the axial direction of the drive shaft, extremely compact construction. If, moreover, the roller bearing and the outer periphery of the drive wheel, which outer periphery is wrapped around by the traction means, run in a common drive plane, the tilting moment of the tensioning device about its bearing point, given correspondingly low tilting load upon the tensioning device, is minimized. The fastening of the roller bearing in relation to the drive wheel and the bearing portion of the tensioner housing can be realized in a known manner, for instance by means of an interference fit, an axial locking ring or both.

As an alternative to the mounting of the tensioner housing on the drive shaft or the drive wheel, the mounting can be realized also on the (stationary) machine housing, for instance on a bearing journal running behind the drive wheel. This mounting can be realized both as a roller bearing and as a slide bearing arrangement, wherein, in the case of the slide bearing, a defined friction with comparatively high damping of the bearing point is also provided, where necessary.

For the benefit of simplified design, the tensioner housing, moreover, shall movably support only one of the tensioning arms, and accordingly the other tensioning arm shall be fastened in the or to the tensioner housing. In the preferred case that the machine is constituted by a starter generator of the internal combustion engine, the tensioning wheel of the movably mounted tensioning arm shall then be disposed in front of the drive wheel in the direction of revolution of the traction means. During operation of the generator, the tensioning wheel of the movably mounted tensioning arm serves to tension the slack strand. The loads and the risk of self-locking at the mounting of the movable tensioning arm are hereby kept low.

Nevertheless, particularly in the case of a starter generator belt drive, it can also conversely be advantageous to dispose the tensioning wheel, mounted fixedly on the tensioner housing, in front of the drive wheel in the direction of revolution of the belt. In this arrangement of the tensioning wheels, the risk of tilting, which is accompanied by striking acoustics and increased wear, of the belt portion taken up on the drive wheel of the starter generator is significantly less than in the aforementioned tensioning wheel arrangement. For in the housing-fixed tensioning wheel there is no bearing clearance, which promotes tilting of the belt, between the tensioning arm and the tensioning wheel.

Where, alternatively, both tensioning arms are movably mounted in or on the tensioner housing, a relative motion in between tensioning arm and tensioner housing can be spread over both tensioning arms and the frictional load on the bearing portions of the tensioning arms can accordingly diminish.

The movably mounted tensioning arm shall have a circular-arc-shaped bearing portion, the spring means shall be configured as a bow spring, and the tensioner housing shall have a correspondingly circular-arc-shaped duct, in which the bearing portion of the tensioning arm and the bow spring are movably accommodated on the circular arc. The tensioning arm, the duct and the bow spring shall run preferably concentrically to the axis of the drive shaft. By a bow spring should be understand, as is known, a helical compression spring, which in its longitudinal direction is curved in the shape of a circular arc. Particularly if the tensioner housing movably supports both tensioning arms, one or both bearing portions of the tensioning arms can be of hollow-cylindrical construction and can receive the bow spring, which is supported therebetween, for the benefit of a maximum possible spring length combined with correspondingly low spring stiffness.

For the purpose of protecting the bow spring from wear, the circular-arc-shaped duct shall be lined, at least in the radially outward direction of the bow spring, with one or more sliders. Expediently, the duct is also provided with sliders on the bearing portion of the movably mounted tensioning arm(s). Through a suitable choice and pairing of materials, a desired friction/damping between tensioner housing and tensioning arm, and between tensioner housing and bow spring, can also hereby be purposefully set.

For the benefit of simple producibility and installability, the tensioner housing can comprise two joined together half shells, which form the duct and preferably have an almost or fully mirror-symmetrical shape. With a view to low manufacturing costs, half shells produced, in particular, as sheet metal formed parts or—for the benefit of a comparatively small mass moment of inertia about the pivot axis—as injection-molded plastics parts are provided. The bearing portion for the mounting of the tensioner housing on the machine can either be produced as a separate part and joined with the half shells or be formed in one piece onto one of the half shells. Alternatively, a tensioner housing having a tubular duct produced in one piece and, according to the design of the bearing portion, having single-part or multipart construction is also conceivable. The term "joining" shall embrace all known methods for the establishment of joining connections.

BRIEF DESCRIPTION OF THE DRAWINGS

Further features of the invention emerge from the following description and from the drawings, in which an illustrative embodiment of an inventive tensioning device for a belt drive of an internal combustion engine with starter generator is represented, wherein:

FIG. 5 shows the front half shell of the tensioner housing;

FIG. 6 shows the bow spring with associated slider;

FIG. 7 shows the rear half shell of the tensioner housing;

FIG. 8a shows the tensioning arm mounted movably in the tensioner housing, with associated sliders;

FIG. 8b shows the tensioning arm according to FIG. 8a in cross section; and

FIG. 9 shows the tensioning arm fastened to the tensioner housing.

DETAILED DESCRIPTION OF THE PREFERRED EMBODIMENTS

Figure 1:
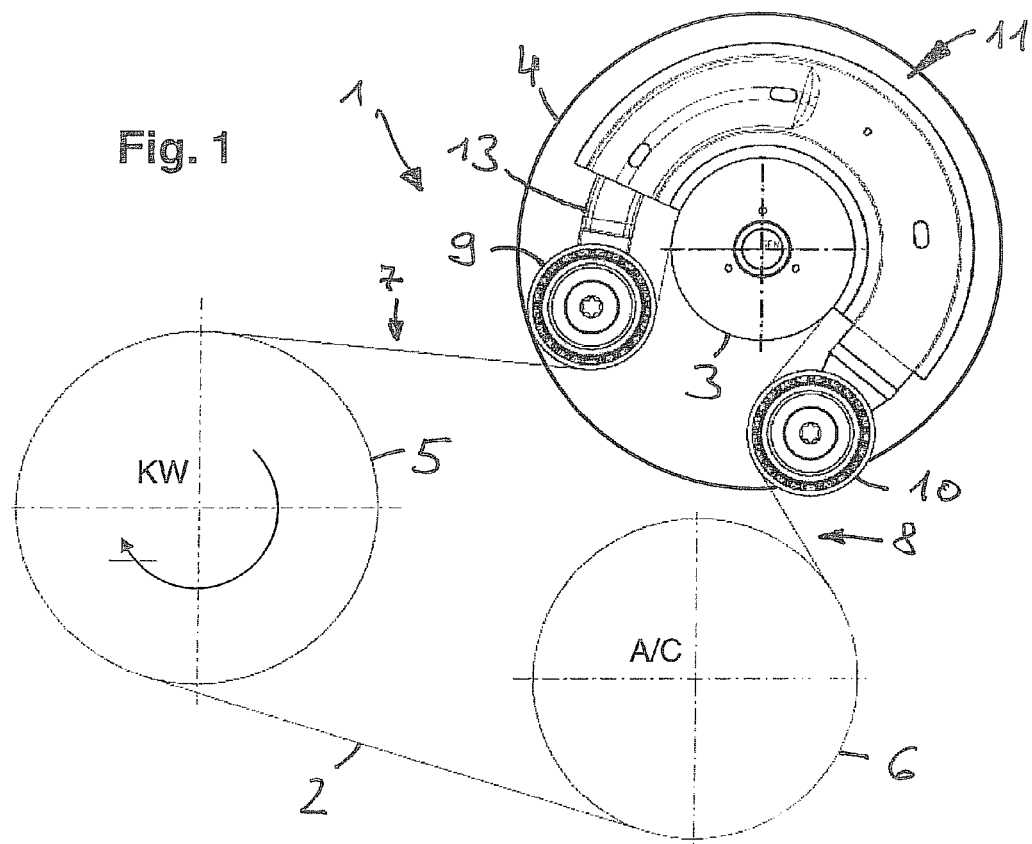
FIG. 1 shows the belt drive and the tensioning device mounted on the starter generator, in simplified overall representation.

FIG. 1 shows in partially schematic representation the layout of a traction mechanism drive, configured as an ancillary unit belt drive 1, of an internal combustion engine. The traction means, which is here configured as a Poly-V-belt 2 and revolves continuously in the direction of revolution identified by the arrow, wraps around the drive wheel 3 of a machine configured as a starter generator 4 and two additional driving wheels 5 and 6, which are disposed on the crankshaft KW of the internal combustion engine or on an air conditioning compressor A/C.

For the starting of the internal combustion engine in the starter mode, the crankshaft sprocket 5 is driven by the starter generator 4, in a manner which is known per se, so as to drive the starter generator 4 in the generator mode when the internal combustion engine is then started. The drive wheel 3, which accordingly alternately delivers torque or takes up torque, produces an alternation of tight strand and slack strand, which is synchronous thereto, at the starter generator 4. In the starting operation of the internal combustion engine, that strand 7 which, in the direction of revolution, runs in front of the drive wheel 3 which is then driving the crankshaft sprocket 5 is the tight strand, and the strand 8 which, in the direction of revolution, runs behind the drive wheel 3 is the slack strand. Conversely, during the generator mode, the strand 7 which, in the direction of revolution, runs in front of the drive wheel 3 that is then driven by the crankshaft sprocket 5 is the slack strand, and the strand which, in the direction of revolution, runs behind the drive wheel 3 is the tight strand.

As mentioned in the introduction, the tensioning of the alternating slack strand calls for a tensioning device having two tensioning wheels 9 and 10, which apply tensioning force to the belt 2, in its direction of revolution, in front of and behind the drive wheel 3. The design of an inventive tensioning device 11, which according to FIG. 1 is disposed on the drive wheel 3 of the starter generator 4, shall be described below with reference to FIGS. 2 to 9.

Figure 2:
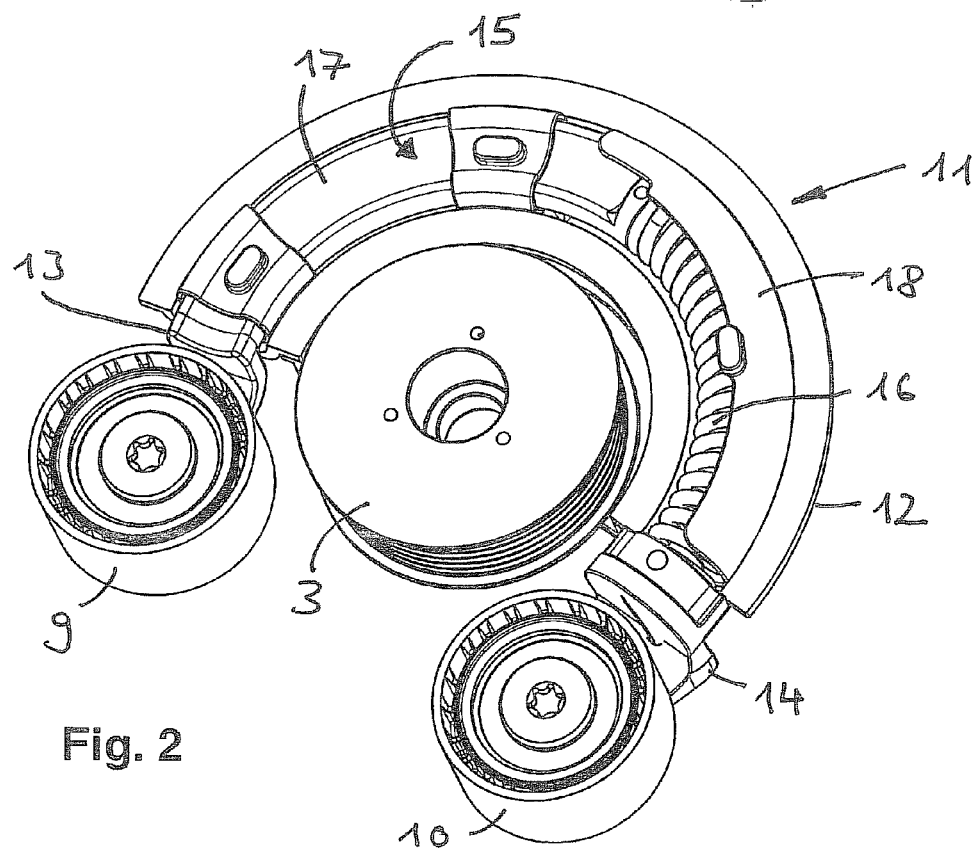
FIG. 2 shows the tensioning device in enlarged perspective view.
Figure 3:
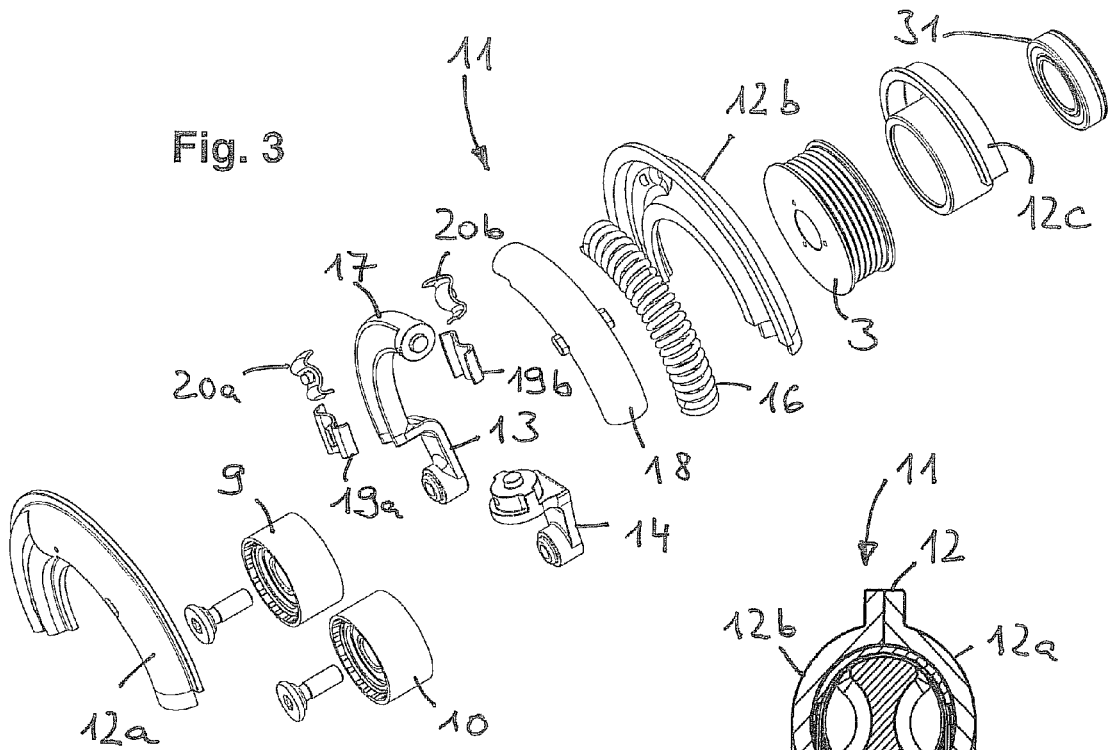
FIG. 3 shows the components of the tensioning device in exploded representation.

FIG. 2 shows a perspective view of that end face of the tensioning device 11 which is facing away from the starter generator, and FIG. 3 shows the tensioning device 11 in exploded representation, wherein, for the purpose of better illustration, the upper half shell, denoted by 12a in FIG. 3, of the tensioner housing 12 is removed in FIG. 2. The two tensioning wheels 9 and 10 are screwed by means of roller bearings (not represented in detail) to associated tensioning arms 13 and 14, of which one tensioning arm 13 is disposed movably in the tensioner housing 12 and the other tensioning arm 14 is fastened to the tensioner housing 12. According to FIG. 1, the tensioning wheels 9, 10 are positioned in the belt drive 1 such that the tensioning wheel 9 of the movably mounted tensioning arm 13 is disposed in front of the drive wheel 3 in the direction of revolution of the belt 2.

The tensioner housing 12 comprises the upper half shell 12a and a lower half shell 12b, which latter is facing the starter generator 4. The half shells 12a, 12b, which are produced as sheet metal formed parts in mirror symmetry to each other and are axially joined together by means of welding, are shaped such that they form inside the tensioner housing 12 a circular-arc-shaped closed duct 15. A spring means in the form of a correspondingly curved bow spring 16, and a correspondingly circular-arc-shaped bearing portion 17 of the movably mounted tensioning arm 13, are accommodated in the duct 15 concentrically to the drive wheel 3 and movably in the direction of the circular arc.

The duct 15 is lined in the radially outward direction of the bow spring 16 with a slider, and here a sliding shell 18 of semicircular cross section. The sliding shell 18, which is injection molded from polyamide, not only serves to protect the bow spring 16 from wear, but also, by means of a suitable material/surface pairing, produces a defined friction/damping behavior in the relative motions between bow spring 16 and tensioner housing 12. For the same reasons, the bearing portion 17 of the movable tensioning arm 13 is also encased in clamp-like sliders 19 and 20 of polyamide, which are formed of two pairs of identical half clamps 19a, 19b and 20a, 20b and the peripheral position of which in the duct 15 is a further parameter for purposefully influencing the friction/damping behavior in the relative motions between tensioning arm 13 and tensioner housing 12.

The sliders 19, 20 emerge in enlarged representation from FIG. 8a, wherein the half clamps 19a, 19b, 20a and 20b correspond to the, in cross section, bone-like shaping of the bearing portion 17 according to FIG. 8b. Compared to a circular cross section, a turning of the tensioning arm 13 about its curved longitudinal axis, and consequently of the tensioning wheel 9 about its rotational axis, can be reduced, particular when the tensioning arm 13 is extended far out of the tensioner housing 12 and its lever arm in the tensioner housing 12, which lever arm positively impedes the turning, is correspondingly small. In the present case, an angle of 20° is provided as the traverse angle, which angle is obtained by butting of the cylindrical spring seat 21 on the bearing portion 17 against the complementary, i.e. raised, opposite form of the half shells 12a, 12b. This becomes clear from FIGS. 5 and 7 comprising the half shells 12a, 12b, which are there shown in enlarged representation.

The securement of the sliding shell 18 and of the sliders 19, 20 in the tensioner housing 12 is realized in a positive-locking manner by means of bosses formed axially thereon, which bosses, according to FIGS. 5, 6, 7 and 8a, respectively engage in recesses or openings complementary thereto. Thus the bosses (uniformly denoted by 22) of the sliders 19, 20 engage in the openings (uniformly denoted by 23) of the half shells 12a, 12b, and the bosses (uniformly denoted by 24) of the sliding shell 18 engage in the openings (uniformly denoted by 25) of the half shells 12a, 12b.

From FIGS. 5 and 7 in conjunction with FIG. 9, it can further be seen that the tensioning arm 14 fastened to the tensioner housing 12 has a mounting spigot 26, which is press-fitted in a tubular projection formed by half cylinders 27a and 27b of the two half shells 12a, 12b and, at the same time, is secured by means of bosses 28 against turning in the projection. Both tensioning arms 13, 14 are produced from as aluminum die castings.

Figure 4:
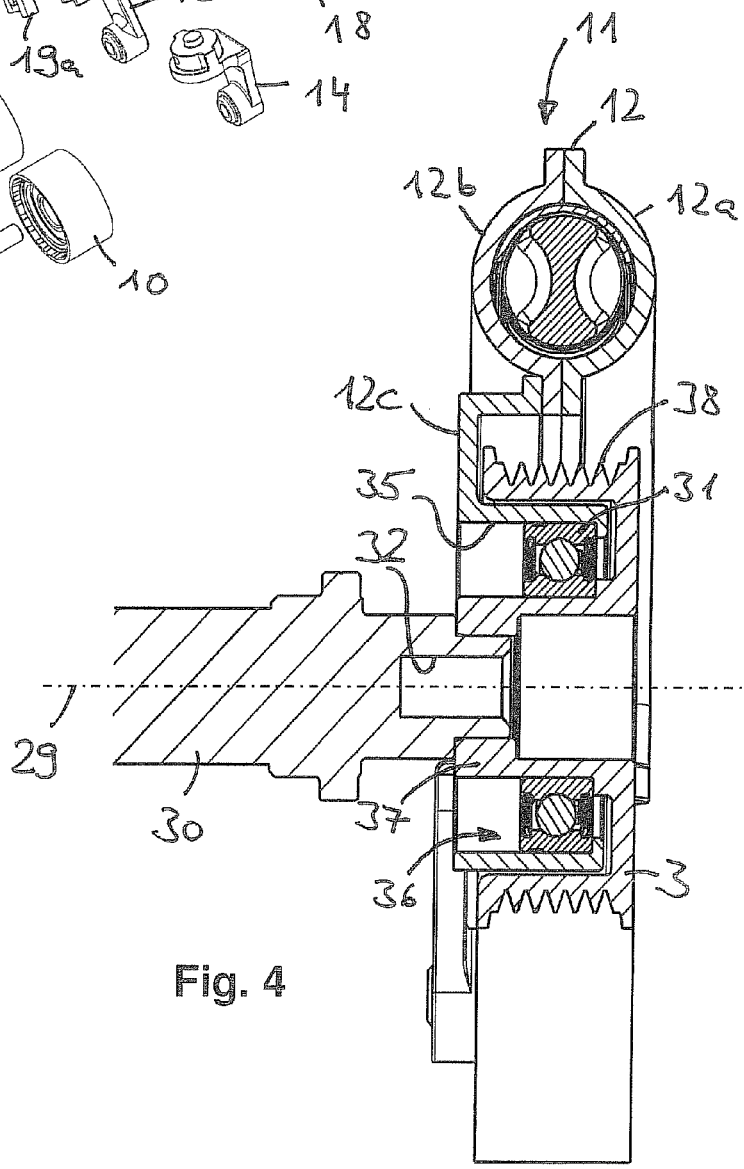
FIG. 4 shows the tensioning device in sectioned representation.

As can be seen from FIGS. 3 and 4, the tensioner housing 12 is mounted on the starter generator 4 such that it is pivotable about the axis 29 of the drive shaft 30 of said starter generator. In the concrete embodiment, a roller bearing in the form of a deep groove ball bearing 31 is provided for the mounting, which roller bearing supports a bearing portion 12c of the tensioner housing 12 against the drive wheel 3 screwed to the drive shaft 30. Only the threaded bore 32 of the drive shaft 30 for the central screw connection (not represented) of the drive wheel 3, which central screw connection is known per se, is represented.

The tensioning device 11 forms with the drive wheel 3 and the ball bearing 31 a structural unit which can be fitted extremely easily onto the drive shaft 30 and which, with the central screw connection, is attached to the starter generator 4. As can be seen from FIGS. 5, 6, 7 and 8a, the structural unit can be delivered to the assembly station in the preloaded state of the bow spring 16, in that the movable tensioning arm 13 in the tensioner housing 12 is fixed in the peripheral direction by means of a locking pin (not represented), which passes through the bores 33 in the half shells 12a, 12b and the bore 34 in the tensioning arm 13.

With renewed reference to FIGS. 3 and 4: like the two half shells 12a, 12b, the bearing portion 12c of the tensioner housing 12, which bearing portion is joined on the end face with said half shells and is here likewise welded thereto, is produced as a sheet metal formed part having a cylindrical projection 35 that runs in a circular recess 36 of the drive wheel 3 concentrically thereto. The ball bearing 31 is inserted radially between the bearing portion 12c and a boss 37 of the drive wheel 3 by means of an interference fit. As a result of the radially internested arrangement of the components, the ball bearing 31 and the outer periphery 38 of the drive wheel 3, which outer periphery is wrapped around by the belt, run in a common drive plane. Consequently, in addition to the axially particularly compact construction, the tilting moment of the tensioning device 11 about its bearing point, given correspondingly low tilting load upon the ball bearing 31, is minimized.

In the event of a load change in the belt drive 1, induced by the momentary operating mode of the starter generator 4, i.e. when the tight strand is exchanged for the slack strand, the inventive mounting of the tensioning device 11 causes the tensioner housing 12 to pivot on the starter generator 4 about the drive shaft axis 29 thereof. In the case of the present illustrative embodiment comprising just one movable tensioning arm 13, the force which produces the pivoting flows, for instance, via the tensioning wheel 9, the tensioning arm 13, the bow spring 16, the tensioner housing 12 and the fixed tensioning arm 14, to the tensioning wheel 10. The pivot motion can be optimized by the friction parameters, which can be set independently of one another, at the roller bearing 31 and at the sliding couplings between the movable tensioning arm 13 and the bow spring 16, on the one hand, and the tensioner housing 12, on the other hand.

REFERENCE SYMBOL LIST 1 belt drive
2 belt
3 drive wheel
4 starter generator
5 driving wheel of the crankshaft
6 driving wheel of the air conditioning compressor
7 strand
8 strand
9 tensioning wheel
10 tensioning wheel
11 tensioning device
12 tensioner housing
13 tensioning arm
14 tensioning arm
15 duct
16 bow spring
17 bearing portion of the movable tensioning arm
18 sliding shell 19 slider
20 slider
21 spring seat
22 bosses of the sliders
23 openings for the slider bosses
24 bosses of the sliding shell
25 openings for the sliding shell bosses
26 mounting spigot of the fastened tensioning arm
27 half cylinders of the half shells
28 bosses on the mounting spigot
29 axis of the drive shaft
30 drive shaft
31 ball bearing
32 threaded bore
33 bore for locking pin
34 bore for locking pin
35 cylindrical projection
36 circular-ring-shaped recess
37 hub of the drive wheel
38 outer periphery of the drive wheel

The invention claimed is:

1. A tensioning device for a traction mechanism drive of an internal combustion engine having a drive wheel arranged on a drive shaft of an auxiliary device, one or more additional driving wheels and a continuously revolving traction element which wraps around the drive wheel and the additional driving wheels, the tensioning device comprises two tensioning arms, having tensioning wheels which are mounted thereon and apply tensioning force to the traction element in front of and behind the drive wheel in a direction of revolution, a spring, which generates the tensioning force, and a tensioner housing pivotally mounted about an axis of the drive shaft of the auxiliary device, the tensioner housing movably supports only one of the tensioning arms subjected to a force of the spring, and the other one of the tensioning arms is fastened to the tensioner housing, the movably mounted tensioning arm has a circular-arc-shaped bearing portion, the spring is configured as a bow spring, and the tensioner housing has a correspondingly circular-arc-shaped duct, in which the bearing portion of the tensioning arm and the bow spring are movably accommodated on the circular arc.

2. The tensioning device as claimed in claim 1, the tensioner housing is mounted on the drive shaft or the drive wheel by a roller bearing.

3. The tensioning device as claimed in claim 2, the tensioning device forms a structural unit with the drive wheel and the roller bearing, said roller bearing being inserted in a circular-ring-shaped recess of the drive wheel radially between a bearing portion of the tensioner housing, said bearing portion running in the recess, and a hub of the drive wheel, and the structural unit is fitted onto the drive shaft.

4. The tensioning device as claimed in claim 3, the roller bearing and an outer periphery of the drive wheel that is wrapped around by the traction element, run in a common drive plane.

5. The tensioning device as claimed in claim 1, the auxiliary device comprises a starter generator of the internal combustion engine, the tensioning wheel of the movably mounted tensioning arm is disposed in front of the drive wheel in the direction of revolution of the traction element.

6. The tensioning device as claimed in claim 1, the duct is lined, at least in a radially outward direction of the bow spring, with one or more sliders.

7. The tensioning device as claimed in claim 1, the tensioner housing comprises two joined-together half shells, which form the duct.

8. The tensioning device as claimed in claim 7, the half shells have a mirror-symmetrical shape.

\* \* \* \* \*